United States Patent
Wu et al.

(10) Patent No.: US 9,651,439 B2
(45) Date of Patent: May 16, 2017

(54) AXIAL FORCE TESTING DEVICE FOR SPINDLES OF MACHINES

(71) Applicants: Yu-Chung Wu, Taichung (TW); Yu-Chieh Wu, Taichung (TW)

(72) Inventors: Yu-Chung Wu, Taichung (TW); Yu-Chieh Wu, Taichung (TW)

(73) Assignee: YINSH PRECISION INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 14/013,030

(22) Filed: Aug. 28, 2013

(65) Prior Publication Data

US 2015/0082896 A1    Mar. 26, 2015

(51) Int. Cl.
*G01L 5/12* (2006.01)
*G01L 5/24* (2006.01)
*G01L 5/00* (2006.01)
*G01L 3/14* (2006.01)

(52) U.S. Cl.
CPC .............. *G01L 5/24* (2013.01); *G01L 5/0061* (2013.01); *G01L 3/1464* (2013.01); *G01L 5/0028* (2013.01); *G01L 5/12* (2013.01)

(58) Field of Classification Search
CPC ....... G01L 5/0061; G01L 5/12; G01L 5/0028; G01L 5/24; G01L 3/1464
USPC ........ 73/862.322, 862.325, 862.195, 862.49, 73/862.331–862.336, 862.621, 862.625, 73/862.631
See application file for complete search history.

(56) References Cited

U.S. PATENT DOCUMENTS

| | | | | |
|---|---|---|---|---|
| 4,435,988 A | * | 3/1984 | Corry | G01L 3/1464 73/862.195 |
| 4,554,838 A | * | 11/1985 | Paus | G01L 5/0033 73/761 |
| 7,260,998 B2 | * | 8/2007 | Madden | G01L 5/24 73/761 |
| 2002/0020230 A1 | * | 2/2002 | Opie | G01L 3/102 73/862.333 |
| 2010/0005897 A1 | * | 1/2010 | Fleury | G01L 5/12 73/781 |
| 2011/0259125 A1 | * | 10/2011 | Fleury | G01L 5/0061 73/862.195 |

\* cited by examiner

*Primary Examiner* — Jonathan Dunlap
(74) *Attorney, Agent, or Firm* — WPAT, P.C., Intellectual Property Attorneys; Anthony King

(57) ABSTRACT

An axial force testing device includes a spindle and a frame. Multiple mediate members are mounted to the spindle which is rotatable relative to the frame by the mediate members. A first fixing member is connected to a first end of a scale which shows the axial force. A first contact member contacts the first fixing member and is mounted to the spindle. A second fixing member is connected to a second end of the scale. A second contact member contacts the second fixing member and is mounted to the spindle. The second contact member has a first contact portion which contacts the mediate members. A locking member is locked to the spindle and presses the first contact member, the first fixing member, the scale, the second fixing member, the second contact member and the mediate members. The axial force applied to the mediate members is displayed on the scale.

6 Claims, 10 Drawing Sheets

AXIAL FORCE TESTING DEVICE FOR SPINDLES OF MACHINES

FIELD OF THE INVENTION

The present invention relates to a testing device, and more particularly, to an axial force testing device with a scale which displays the value of the axial force of the mediate members when rotating the locking member on the spindle.

BACKGROUND OF THE INVENTION

FIG. 10 shows multiple mediate members 93, such as bearings, are mounted to a spindle 91 which is rotatably connected to a fixed frame 92 by the mediate members 93. The spindle 91 is the high speed spindle installed to a machine and a locking member 94 is locked on the distal end of the spindle 91 so that the mediate members 93 are prevented from dropping from the spindle 91. The locking member 94 can be a precision nut.

The locking member 94 is locked on the spindle 91 by using a wrench which outputs a pre-set torque so that the locking member 94 is properly locked on the spindle 91 and presses the mediate members 93 which are located between the spindle 91 and the fixed frame 92. When the spindle 91 rotates at high speed relative to the fixed frame 92, the force applied to the mediate members 93 is the axial force which is the force applied on the axis of the spindle 91.

There is a pre-set value for the axial force applied to the mediate members 93. The value is larger along with the larger size of the diameter or width of the mediate members. The manufacturers prepares a testing device to which the spindle 91 and the fixed frame 92 are installed, when the locking member 94 starts to be locked, the testing device shows the torque of the locking member 94 and when the torque applied to the locking member 94 reaches the pre-set value, the mediate members 93 are supposed reach the pre-set axial force. The manufacturers are acknowledged the axial force applied to the mediate members 93 by checking the torque output from the wrench.

However, the spindle 91 installed on the testing device cannot performs exactly the same as the spindle 91 on a machine, generally, the performance of the spindle on the testing device is better than that on the real machine, the required torques of the two different situations are different.

The cost for manufacturing the testing device which is a customer made device is high, and the testing device requires routine maintenance which increases the economic burden of the manufacturers.

The fixed frame 92 is specially manufactured so as to be cooperated with the testing device, and the fixed frame 92 will be smaller than the frame on the machine, so that the test result will be varied.

The present invention intends to provide an axial force testing device which improves the shortcomings of the conventional testing device.

SUMMARY OF THE INVENTION

The present invention relates to an axial force testing device and comprises a spindle and a frame. Multiple mediate members are mounted to the spindle which is rotatable relative to the frame by the mediate members. A first fixing member is connected to a first end of a scale which shows the axial force. A first contact member contacts the first fixing member and is mounted to the spindle. A second fixing member is connected to a second end of the scale. A second contact member contacts the second fixing member and is mounted to the spindle. The second contact member has a first contact portion which contacts the mediate members. A locking member is locked to the spindle and presses the first contact member, the first fixing member, the scale, the second fixing member, the second contact member and the at least one mediate member. The locking member is rotated by a torque, and a corresponding axial force is displayed on the scale. The axial force is the force applied to the mediate members that are connected to the frame.

The locking member is locked to the distal end of the spindle and presses the first contact member, the first fixing member, the scale, the second fixing member, the second contact member and the at least one mediate member. The torque that is applied to the locking member is transmitted to the scale which shows the required axial force that the mediate members are connected to the frame. The manufacturers can buy the axial force testing device of the present invention which is directly connected to the spindle of the machine so as to detect the required force for the mediate members that are connected to the frame. In other words, the manufacturers can easily have the required force for the mediate members on the machine.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
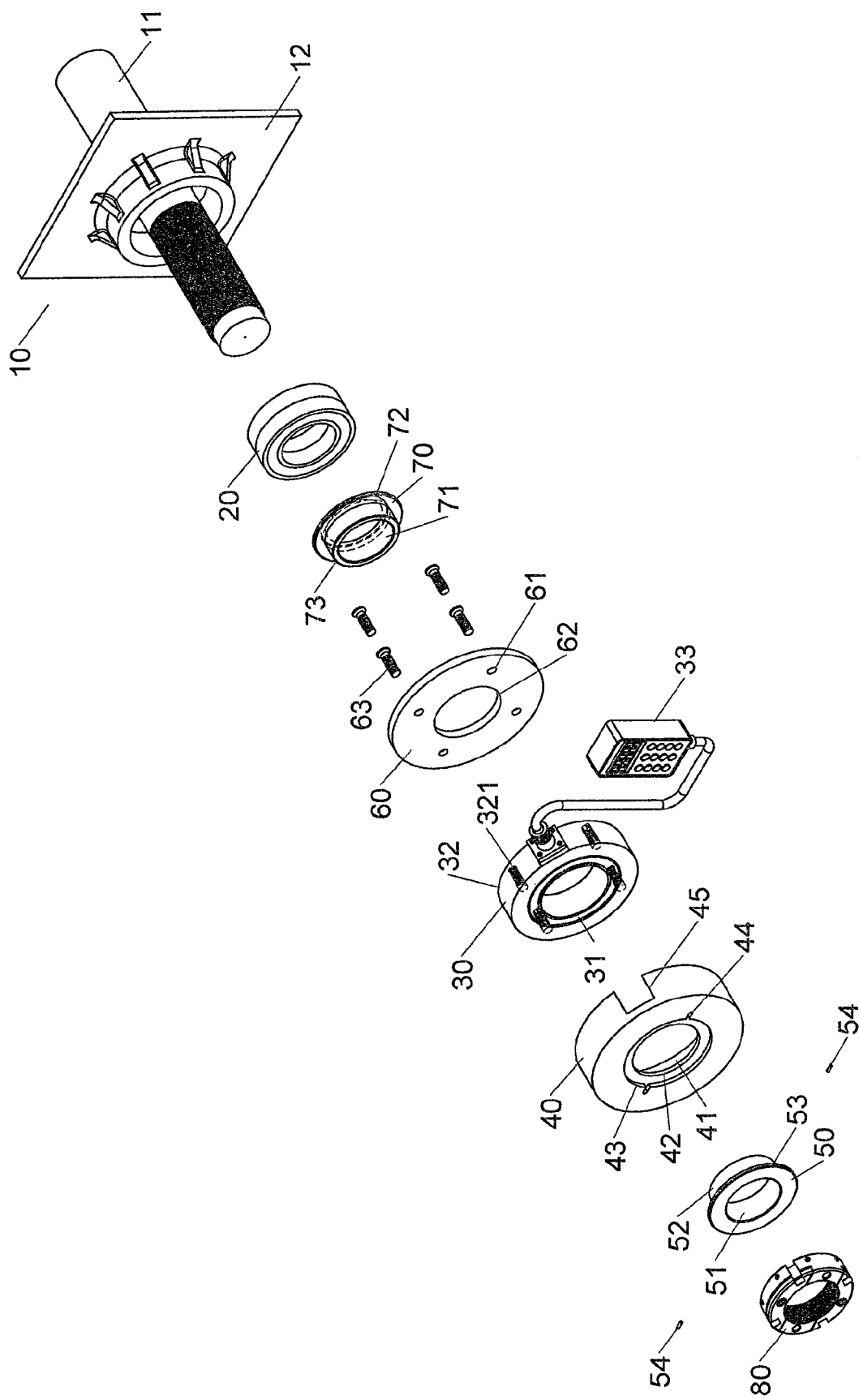
FIG. 1 is an exploded view to show the axial force testing device of the present invention.

Referring to FIGS. 1 to 4, the axial force testing device of the present invention comprises a body 10, multiple mediate members 20, a scale 30, a first fixing member 40, a first contact member 50, multiple connection members 54, a second fixing member 60, multiple bolts 63, a second contact member 70 and a locking member 80. The body 10 has a spindle 11 and a frame 12, wherein the spindle 11 is the high speed spindle on a machine and the frame 12 is a portion of the machine. The multiple mediate members 20 are mounted to the spindle 11 and located between the spindle 11 and the frame 12, so that the spindle 11 is rotatable relative to the frame 12 by the mediate members 20. The mediate members 20 are located along the spindle 11 in a straight line. The scale 30 is a LOAD CELL which has a deformable piece which deforms by a pressing force or a pulling force. The deformation generates change of resistance which is detected by a Wheatstone Bridge. The larger the output is, the larger the deformation is. The scale 30 has a first end 31, a second end 32 and a display member 33 which shows the axial force applied to the first end 31 and transmitted to the second end 32. The axial force is applied along the axis of the spindle 11. The second end 32 has multiple first fixing portions 321 which are threaded holes. The first fixing member 40 is connected with the first end 31 of the scale 30 and has a room 41 in which the scale 30 is received. The first fixing member 40 has a first mounting portion 42, a first connection portion 43 and a second connection portion 44. The first connection portion 43 is a circular recess. The first fixing member 40 has a notch 45 in a periphery thereof so that the pipe of the scale 30 extends through the notch 45.

The first contact member 50 is engaged with the first connection portion 43 and contacts the first fixing member 40. The first contact member 50 has a second mounting portion 51 which is mounted to the spindle 11. The first contact member 50 has a third mounting portion 52 which is engaged with the first mounting portion 42. The first contact member 50 has multiple third connection portions 53 which are holes defined in the periphery of the first contact member 50. The number of the multiple connection members 54 is the same as that of the third connection portions 53. Each connection member 54 is engaged with the third connection portion 53 corresponding thereto. Each connection member 54 is located in the second connection portion 44. The second fixing member 60 is connected with the second end 32 of the scale 30 and has multiple through holes 61, the number of the through holes 61 is the same as the first fixing portions 321. The second fixing member 60 has a fourth mounting portion 62 at the center thereof. The spindle 11 extends through the fourth mounting portion 62.

The bolts 63 extend through the through holes 61 and are threadedly connected to the first fixing portions 321 of the scale 30 so that the second fixing member 60 is connected to the second end 32. The second contact member 70 contacts the second fixing member 60 and has a fifth mounting portion 71 which is mounted to the spindle 11. The second contact member 70 has a first contact portion 72 and a sixth mounting portion 73, wherein the first contact portion 72 contacts the mediate members 20 and the sixth mounting portion 73 is mounted to the fourth mounting portion 62.

Figure 2:
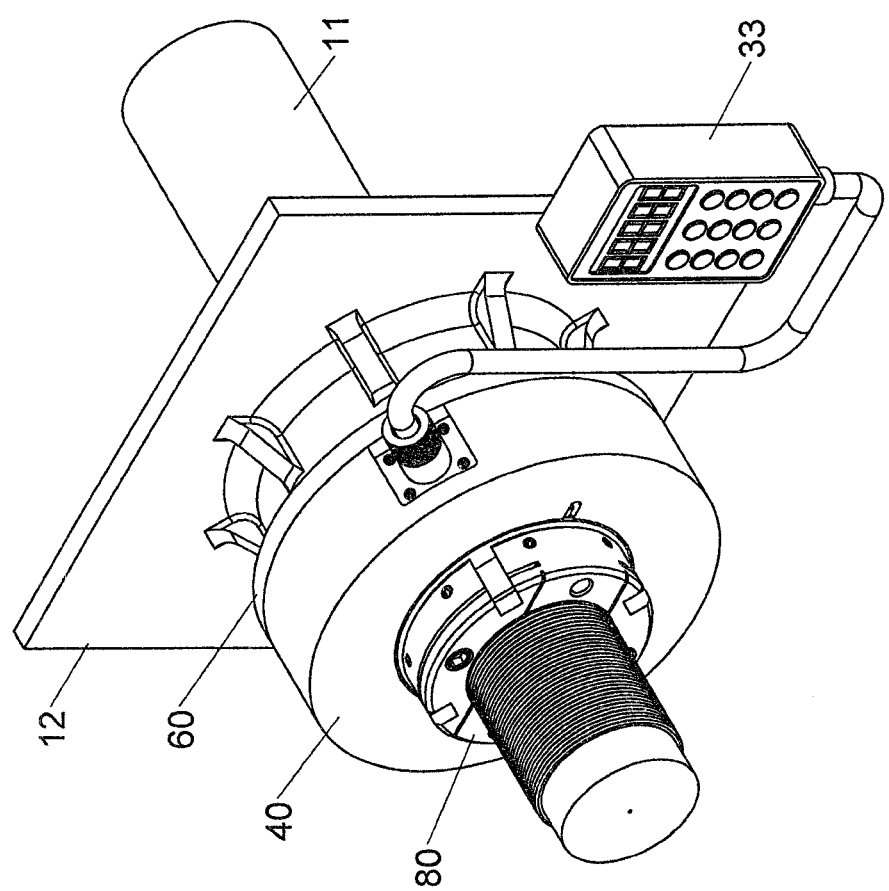
FIG. 2 is a perspective view to show the axial force testing device of the present invention.
Figure 3:
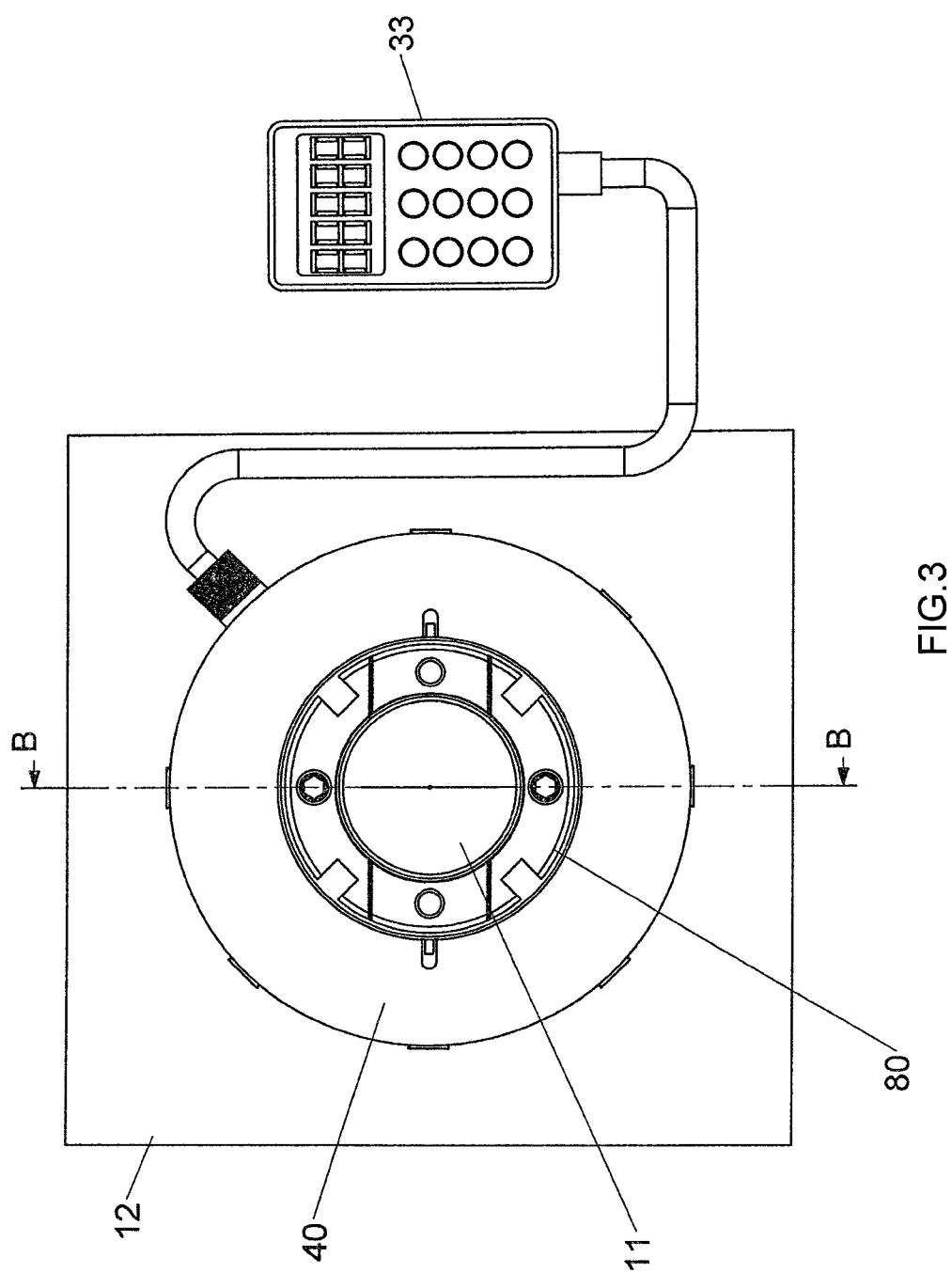
FIG. 3 is a front view to show the axial force testing device of the present invention.
Figure 4:
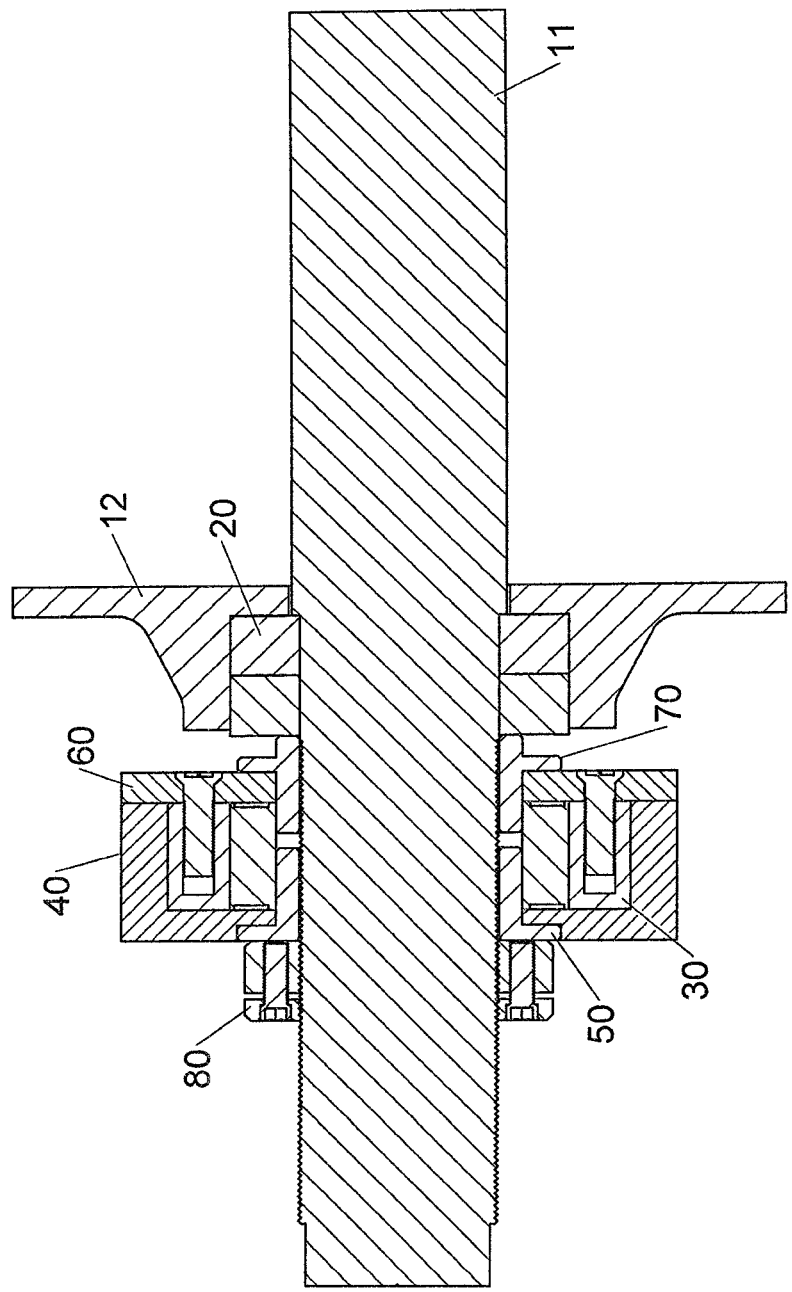
FIG. 4 is a cross sectional view, taken along line B-B in FIG. 3.

The locking member 80 locked to the distal end of the spindle 11 and presses the first contact member 50, the first fixing member 40, the scale 30, the second fixing member 60 and the second contact member 70. The first contact portion 72 of the second contact member 70 presses the mediate members 20. When a torque is applied to the locking member 80, the torque is applied to the scale 30 which displays the value of the torque which is the axial force applied to the mediate members 20 which are connected to the frame 20. The locking member 80, the first contact member 50, the first fixing member 40, the scale 30, the second fixing member 60 and the second contact member 70 press the mediate members 20 between the spindle 11 and the frame 12 as shown in FIG. 2.

Figure 5:
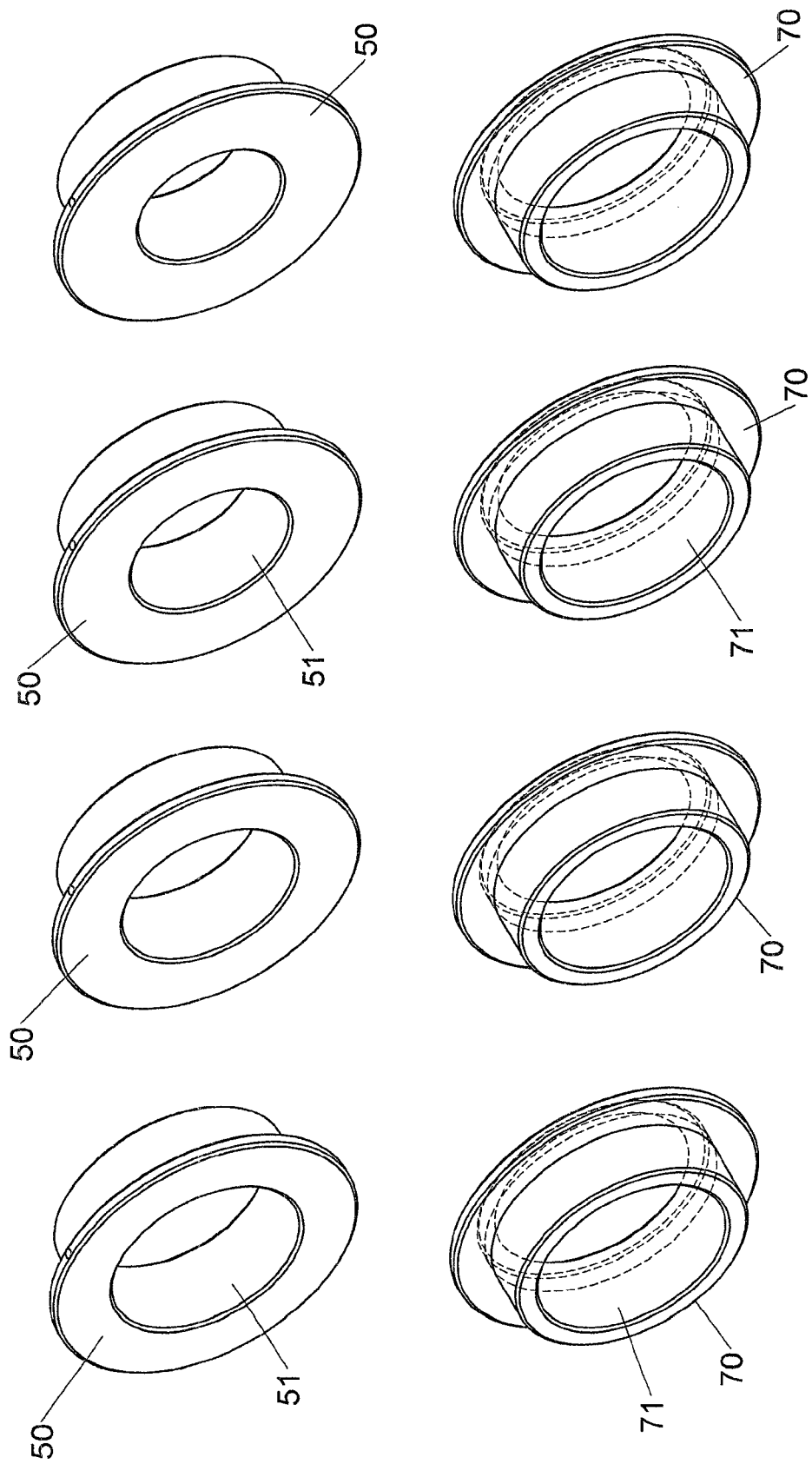
FIG. 5 is a perspective view to show the first and second contact members of the axial force testing device of the present invention.

As shown in FIG. 5, the spindle 11 has different diameters. The second mounting portion 51 of the first contact member 50 and the fifth mounting portion 71 of the second contact member 70 have different diameters to be mounted to the spindle 11 of different diameters. By this way, the users save money to purchase other parts.

Figure 6:
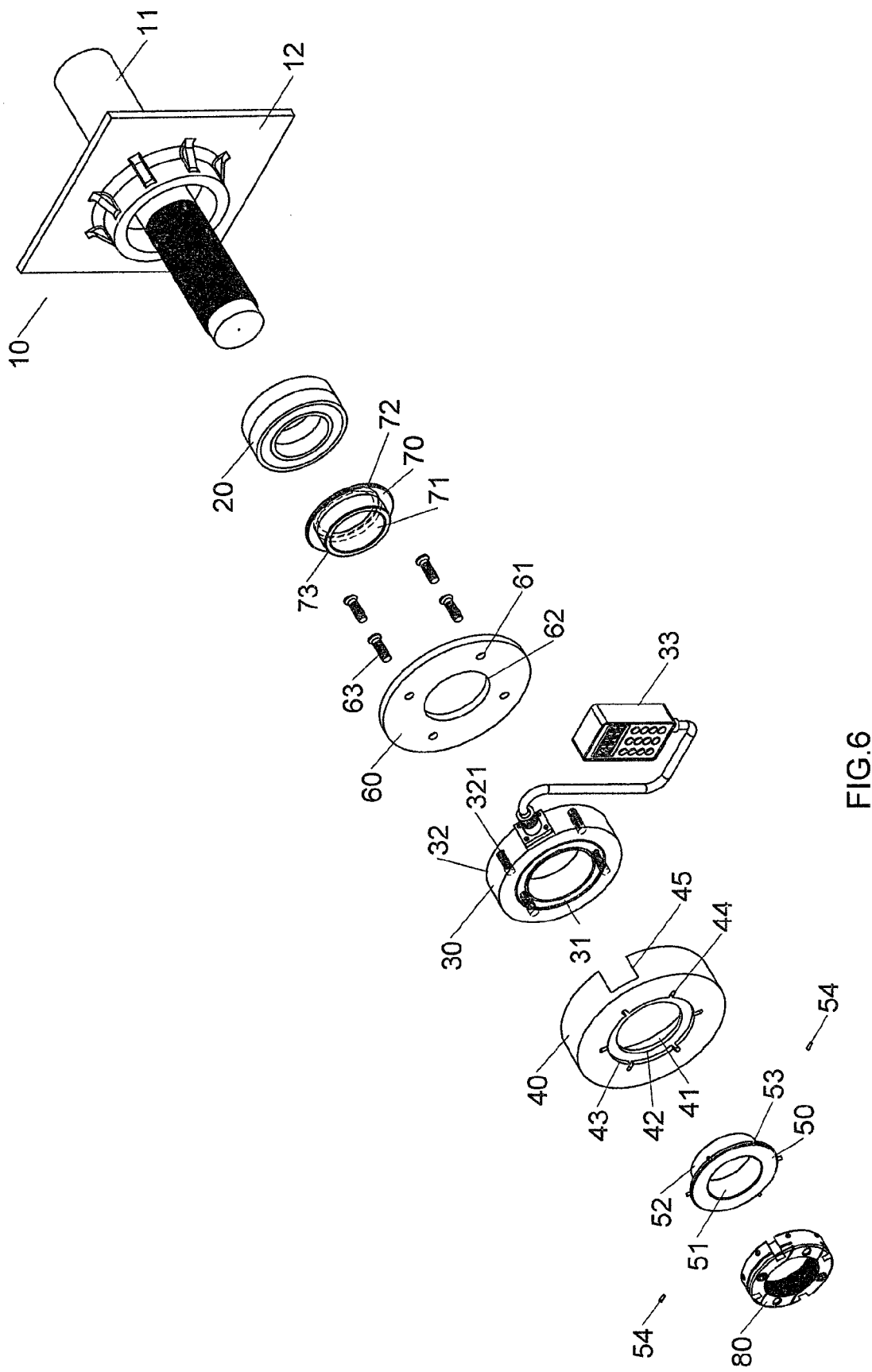
FIG. 6 is an exploded view to show the second embodiment of the axial force testing device of the present invention.

FIG. 6 shows that the first fixing member 40 has six second connection portions 44 which are located along a circle. The first contact member 50 has six third connection portions 53.

Figure 7:
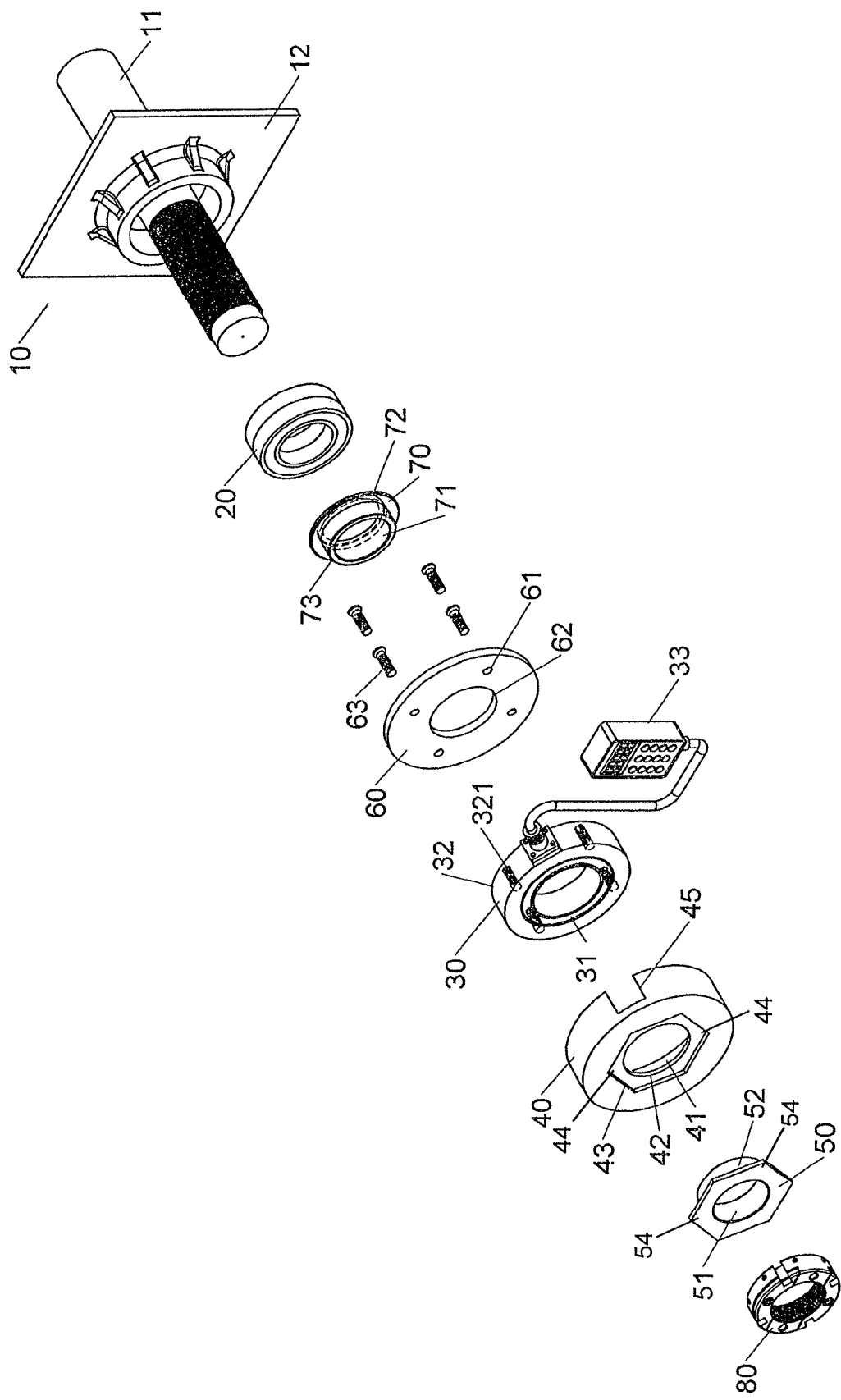
FIG. 7 is an exploded view to show the third embodiment of the axial force testing device of the present invention.

As shown in FIG. 7, the first connection portion 43 of the first fixing member 40 is a non-circular recess. The cross section area of the first contact member 50 is shaped to be received in the first connection portion 43. The connection members 54 are integrally formed as the edges of the first contact member 50 and can be received in the second connection portions 44 formed as the corners of the first connection portion 43.

Figure 8:
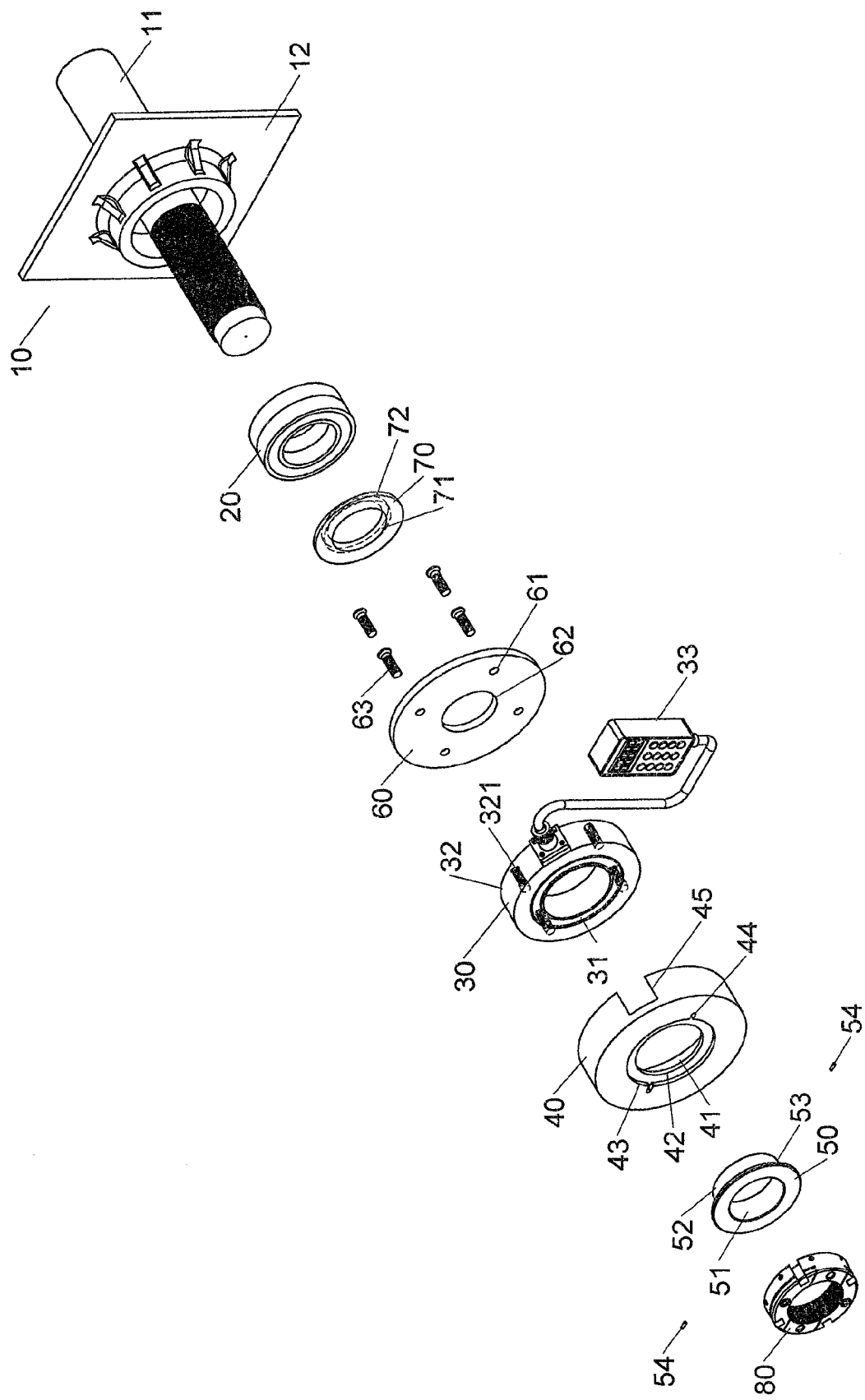
FIG. 8 is an exploded view to show the fourth embodiment of the axial force testing device of the present invention.
Figure 9:
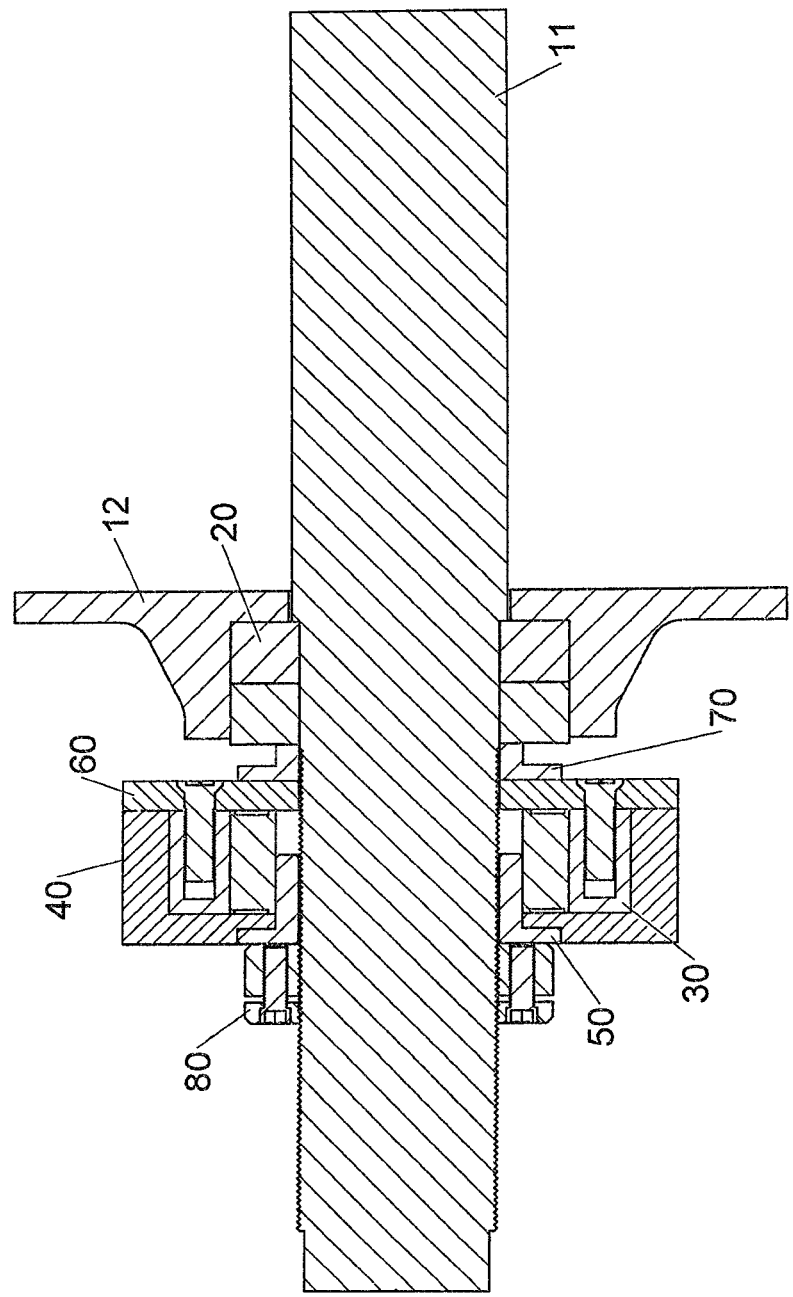
FIG. 9 is a cross sectional view to show the fourth embodiment of the axial force testing device of the present invention.
Figure 10:
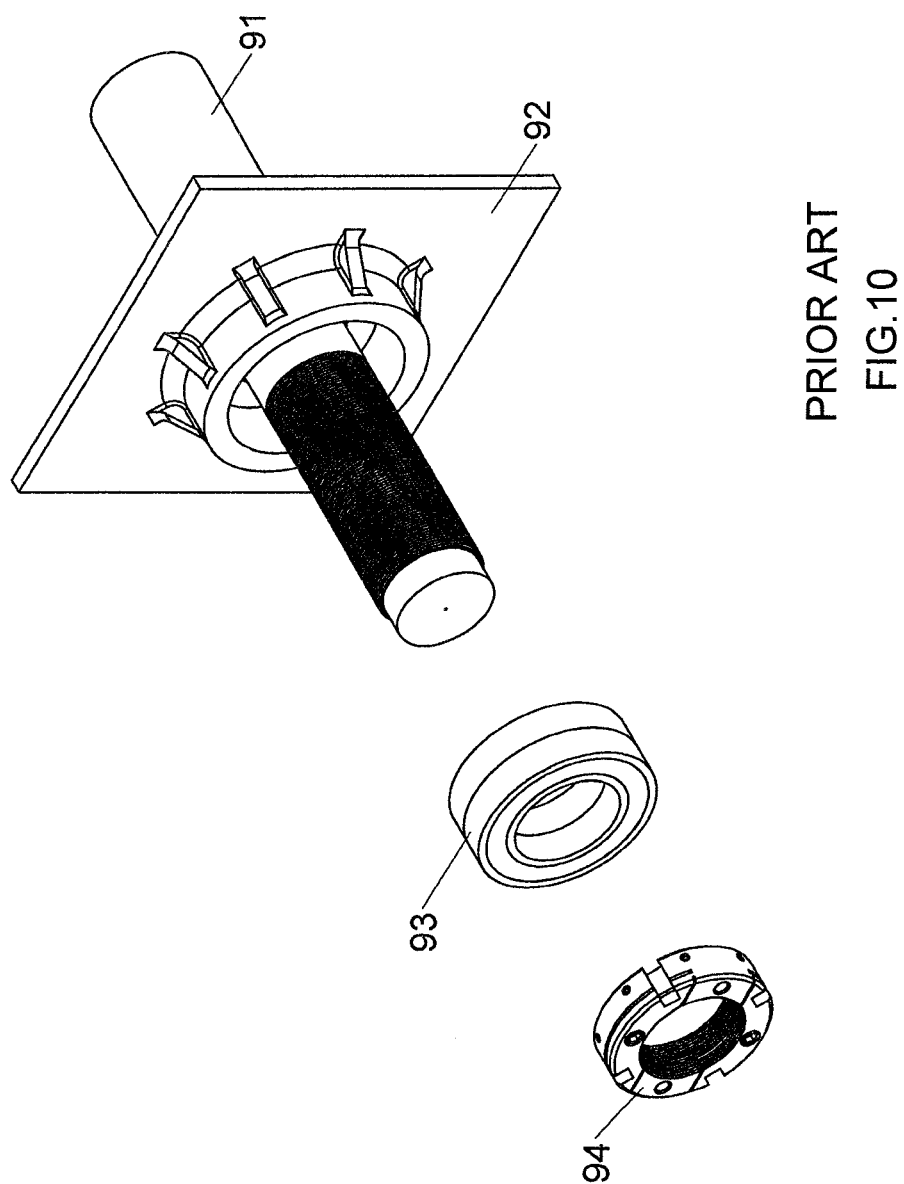
FIG. 10 is the exploded view to show the conventional axial force testing device.

As shown in FIGS. 8 and 9, the fourth mounting portion 62 of the second fixing member 60 is mounted to the spindle 11. The second contact member 70 does not have the sixth mounting portion 73.

When a part similar to the mediate member 20 has to be connected to the frame 12 and is required to have a pre-set axial force, the present invention can be used to this case.

The torque applied to the locking member 80 is also applied to the scale 30 which detects the load and the load is applied to the mediate members 20, so that the axial force applied to the mediate members 20 so as to be connected to the frame 12 can be acknowledged. The manufacturers prepare the testing device of the present invention to directly test the spindle 11 of their machine to know the torque needed to be applied to the locking member 80 such that the mediate members 20 reach the pre-set axial force.

The machine with similar structure has similar spindle 11 and frame 12, so that the locking member 80 of the present invention can be directly locked to the spindle 11 of the machine to get the information about the torque required.

As shown in FIG. 5, when the spindle 11 has different diameters, the second mounting portion 51 of the first contact member 50 and the fifth mounting portion 71 of the second contact member 70 have different diameters to be mounted to the spindle 11 of different diameters. In other words, only two parts are replaced to be cooperated with the spindle of different diameters.

While we have shown and described the embodiment in accordance with the present invention, it should be clear to those skilled in the art that further embodiments may be made without departing from the scope of the present invention.

What is claimed is:
1. An axial force testing device comprising:
a body having a spindle and a frame, the spindle adapted to be installed to a machine and the frame adapted to be a portion of the machine;
multiple mediate members mounted to the spindle and located between the spindle and the frame, the spindle being rotatable relative to the frame by the mediate members, the mediate members located along the spindle;
a scale having a first end, a second end and a display member which shows an axial force applied to the first end and transmitted to the second end, the axial force being applied along an axis of the spindle, the second end having multiple first fixing portions which are threaded holes;

a first fixing member connected with the first end of the scale and having a room in which the scale is received, the first fixing member having a first mounting portion, a first connection portion and a second connection portion, the first fixing member having a notch in a periphery thereof, a pipe of the scale extending through the notch;

a first contact member engaged with the first connection portion and contacting the first fixing member, the first contact member having a second mounting portion which is mounted to the spindle, the first contact member having a third mounting portion which is engaged with the first mounting portion, the first contact member having multiple third connection portions which are holes defined in a periphery of the first contact member;

a number of multiple connection members being the same as the third connection portions, each connection member connected with the third connection portion corresponding thereto, each connection member located in the second connection portion;

a second fixing member connected with the second end of the scale and having multiple through holes, a number of the through holes being the same as the first fixing portions, the second fixing member having a fourth mounting portion at a center thereof, the spindle extending through the fourth mounting portion;

multiple bolts extending through the through holes and being threadedly connected to the first fixing portions of the scale so that the second fixing member is connected to the second end;

a second contact member contacting the second fixing member and having a fifth mounting portion which is mounted to the spindle, the second contact member having a first contact portion and a sixth mounting portion, the first contact portion contacting the mediate members, the sixth mounting portion mounted to the fourth mounting portion, and a locking member locked to a distal end of the spindle and pressing the first contact member, the first fixing member, the scale, the second fixing member and the second contact member, the first contact portion of the second contact member pressing the mediate members, when a torque is applied to the locking member, the scale displays a value of the torque which is the axial force applied to the mediate members.

2. The device as claimed in claim 1, wherein the scale is a LOAD CELL which has a deformable piece which deforms by a pressing force or a pulling force, the deformation generates change of resistance which is detected by a Wheatstone Bridge, the output is larger when the deformation is larger.

3. The device as claimed in claim 1, wherein the spindle has different diameters, the second mounting portion of the first contact member and the fifth mounting portion of the second contact member have different diameters to be mounted to the spindle.

4. The device as claimed in claim 1, wherein the first fixing member has six second connection portions which are located along a circle, the first contact member has six third connection portions.

5. The device as claimed in claim 1, wherein the first connection portion of the first fixing member is a non-circular recess, a cross section area of the first contact member is shaped to be received in the first connection portion.

6. The device as claimed in claim 1, wherein the fourth mounting portion of the second fixing member is mounted to the spindle.

* * * * *